May 17, 1949. W. W. ZIMMERMAN 2,470,542
ELECTRICAL POWER SUPPLY
Filed Oct. 29, 1947
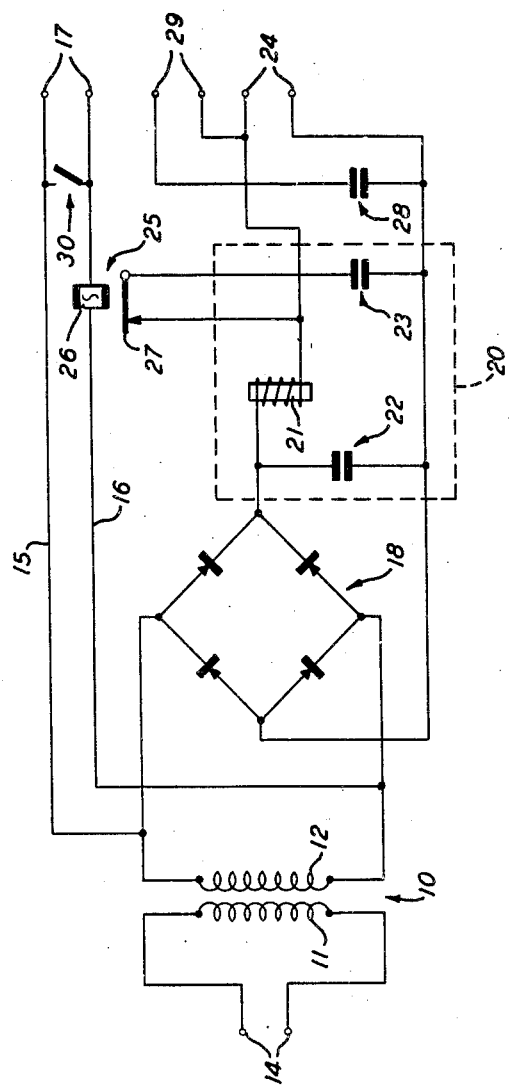
INVENTOR
W. W. ZIMMERMAN
BY
ATTORNEY Patented May 17, 1949

2,470,542

UNITED STATES PATENT OFFICE 2,470,542

ELECTRICAL POWER SUPPLY

Walter W. Zimmerman, New York, N. Y., assignor to Western Electric Company, Incorporated, New York, N. Y., a corporation of New York Application October 29, 1947, Serial No. 782,719

4 Claims. (Cl. 171—97)

1

This invention relates to an electrical power supply and more particularly to an electrical network for supplying from an A. C. source both alternating testing current, and direct "battery" current or pulsating direct "tone" current for use in a variety of electrical testing apparatus.

Electrical test sets, i. e. assemblies of electrical devices to be used for applying electrical tests or measurements to electrical apparatus exist in almost infinite variety of form, structure and use. One very large class of such sets requires to be supplied in use with alternating "test" current or voltage and simultaneously with direct current or voltage, usually called "battery" current because ordinarily provided by means of a primary or secondary battery specially provided for that purpose.

An object of the present invention is to provide an electrical power supply network for testing apparatus of such nature as to be easily constructed in a single, light, durable, and handy assembly and which requires no bulky, massive or heavy battery as component or auxiliary.

With the above and other objects in view, the invention may be illustratively embodied in an electrical power supply network for connection to an alternating current source to modify the current therefrom and comprising a current rectifying unit to be connected to the source, a pair of alternating current output terminals connected in parallel with the rectifier to the source, an alternating current buzzer having the operating coil thereof connected in series between one of the alternating current output terminals and the rectifying unit, a filter unit having its input terminals connected across the output terminals of the rectifying unit and including a condenser in the filter circuit, and a pair of direct current output terminals connected across the output of the filter unit, the armature of the buzzer being connected as a relay contact in the filter circuit in series with the filter circuit condenser to make and break the circuit through the said condenser when the buzzer is actuated.

Other objects and features of the invention will appear from the following detailed description of one embodiment of the invention, taken in connection with the accompanying drawing, the single figure of which presents the circuit diagram of a power supply device constructed in accordance with the invention.

As herein illustrated and described the invention comprises a transformer 10, the primary winding 11 of which may be connected through input terminals 14 to any suitable source of A. C.

2 current. The secondary winding 12 is connected through leads 15 and 16 to A. C. power output terminals 17.

A rectifying device generally indicated at 18 has its input connected across the secondary 12. As here shown the device 18 may be thought of as the familiar copper oxide disc rectifier, but may be, of course, any suitable and convenient electrical device to convert the A. C. input from the transformer into pulsating direct current.

The output of the rectifier 18 is fed into a filter generally indicated by the dotted line rectangle 20. The components of this filter are a coil 21, a condenser 22, and condenser 23 interconnected in a closed loop as shown, and so dimensioned electrically that the pulsating direct current input to the filter 20 is converted into substantially smooth direct current at the output terminals 24.

To provide a pulsating direct current, often called a "tone" current, when desired the output of the filter 20 is also connected, through the condenser 28, to "tone" terminals 29. And, for use as hereinafter described, means, such as the switch 30, are provided by which the current in the leads 15 and 16 may be short circuited beyond the coil 26.

With the switch 30 open and a circuit closed between the terminals 17 by a test object or through a test set and a test object, the buzzer 25 is set in operation by the current through the lead 16, causing the armature 27 to make and break the filter circuit through the condenser 23 in rhythm with the frequency of the A. C. source. During the periods when this circuit is closed the filter operates normally and delivers smooth D. C. potential which passes to the terminals 24 but cannot pass the condenser 28 to the terminals 29. During periods when the filter circuit is open at 27, the filter is largely inoperative as such; and pulsating direct current is fed to both pairs 24 and 29 of terminals. Thus at the terminals 29 there appear equi-spaced pulses of direct current corresponding in rhythm to the action of the armature 27; while the terminals 24 will supply continuous direct current with the same pulses superimposed.

In case only the kind of current available as above at either the terminals 24 or 29 is wanted and the alternating current at 17 cannot or is not to be used, the switch 30 may be closed to effect operation of the buzzer 25.

In case only smooth direct current is desired, the terminals 17 must be left disconnected and the switch 30 open, when smooth D. C. will be supplied at the terminals 24.

Thus the apparatus can deliver from an A. C. source, A. C. of corresponding frequency, or smooth D. C. or discontinuous pulses of D. C., or continuous and pulsing D. C., and it can deliver simultaneously any two or all three of the first one and last two of these four as may be desired.

What is claimed is:

1. An electrical power supply network for connection to an alternating current source to modify the current therefrom and comprising a current rectifying unit to be connected to the source, a pair of alternating current output terminals connected in parallel with the rectifier to the source, an alternating current buzzer having the operating coil thereof connected in the connection between one of the alternating current output terminals and the source, a filter unit having its input terminals connected across the output terminals of the rectifying unit and including a condenser in the filter circuit, and a pair of direct current output terminals connected across the output of the filter unit, the armature of the buzzer being connected as a relay contact in the filter circuit in series with the filter circuit condenser to make and break the circuit through the said condenser when the buzzer is actuated.

2. An electrical power supply network for connection to an alternating current source to modify the current therefrom and comprising an inductive voltage modifying unit to be connected to the source, a current rectifying unit having the input thereof connected to the output of the inductive unit, a pair of alternating current output terminals connected in parallel with the rectifier to the source, an alternating current buzzer having the operating coil thereof connected in the connection between one of the alternating current output terminals and the source, a filter unit having its input terminals connected across the output terminals of the rectifying unit and including a condenser in the filter circuit, and a pair of direct current output terminals connected across the output of the filter unit, the armature of the buzzer being connected as a relay contact in the filter circuit in series with the filter circuit condenser to make and break the circuit through the said condenser when the buzzer is actuated.

3. An electrical power supply network for connection to an alternating current source to modify the current therefrom and comprising a current rectifying unit to be connected to the source, a pair of alternating current output terminals connected in parallel with the rectifier to the source, an alternating current buzzer having the operating coil thereof connected in the connection between one of the alternating current output terminals and the source, a filter unit having its input terminals connected across the output terminals of the rectifying unit and including a condenser in the filter circuit, a pair of direct current output terminals connected across the output of the filter unit, and a second pair of direct current output terminals also connected across the output of the filter unit but with a condenser in series between one of the said terminals and the filter unit, the armature of the buzzer being connected as a relay contact in the filter circuit in series with the filter circuit condenser to make and break the circuit through the said condenser when the buzzer is actuated.

4. An electrical power supply network for connection to an alternating current source to modify the current therefrom and comprising an inductive voltage modifying unit to be connected to the source, a current rectifying unit having the input thereof connected to the output of the inductive unit, a pair of alternating current output terminals connected in parallel with the rectifier to the source, an alternating current buzzer having the operating coil thereof connected in the connection between one of the alternating current output terminals and the source, a filter unit having its input terminals connected across the output terminals of the rectifying unit and including a condenser in the filter circuit, a pair of direct current output terminals connected across the output of the filter unit, and a second pair of direct current output terminals also connected across the output of the filter unit but with a condenser in series between one of the said terminals and the filter unit, the armature of the buzzer being connected as a relay contact in the filter circuit in series with the filter circuit condenser to make and break the circuit through the said condenser when the buzzer is actuated.

WALTER W. ZIMMERMAN.

REFERENCES CITED

The following references are of record in the file of this patent:

UNITED STATES PATENTS

| Number | Name | Date |
| --- | --- | --- |
| 2,395,670 | Kelly | Feb. 26, 1946 |
| 2,428,488 | Shormley | Oct. 7, 1947 |
| 2,434,946 | McKim | Jan. 27, 1948 |